Patented Sept. 28, 1943

2,330,641

UNITED STATES PATENT OFFICE 2,330,641

PREPARATION OF 4-PYRIDINE SULPHONIC ACID

Adolph E. Tiesler, Pearl River, N. Y., assignor to Lederle Laboratories, Inc., New York, N. Y., a corporation of Delaware No Drawing. Application November 20, 1940, Serial No. 366,381

7 Claims. (Cl. 260—290)

This invention relates to an improved process for the preparation of 4-pyridine sulphonic acid and the alkali metal salts of 4-pyridine sulphonic acid.

The only prior method of which I am aware for the preparation of 4-pyridine sulphonic acid is the one described by Koenigs and Kinne (Ber. 54, 1357, 1921). The method of Koenigs and Kinne is not practical for the preparation of sulphonic acid on a large scale because the yields are low and the large number of steps which must be carried out increase the cost of production.

The object of this invention is to provide a practical process for the preparation of 4-pyridine sulphonic acid. It is a further object of the present invention to provide a process whereby the sulphonic acid group can be linked to the 4-carbon atom on the pyridine ring and 4-pyridine sulphonic acid produced in a single step. It is also an object of this invention to provide a process for the preparation of 4-pyridine sulphonic acid which produces high yields.

In accordance with the present invention 4-pyridine sulphonic acid is prepared by hydrolysis of 4-pyridyl pyridinium dichloride in a sulphite or a bisulphite solution.

When a sulphite is employed the reaction may be carried out as follows: 4-pyridyl pyridinium dichloride is dissolved in water and to this is added a solution of sodium sulphite in the ratio 1, 2 or 3 moles for each mole of the dichloride. Two moles of sodium sulphite are the theoretical quantities for producing a complete reaction. One mole results in the production of some of the sulphonic acid, but we have found that it is preferable to use 3 moles of the sodium sulphite to insure an excess and give best yields. More specifically, an aqueous solution of the dichloride and the sulphite is placed in an ampule, pressure bottle or the like, and sealed; the ampule is then heated in an autoclave at a temperature of about 145°–160° C. for from 6 to 10 hours. After this time, the reaction product is recovered by concentration and extraction with alcohol. The reaction which takes place in the above process is most probably as follows:

4 pyridyl pyridinium dichloride (1 mol) +sodium sulphite (2 mols) =4-pyridine sulphonic acid sodium salt (2 mols) +sodium chloride (2 mols).

When bisulphite is employed in carrying out the reaction, the free sulphonic acid is produced directly as compared with the sodium sulphite reaction which gives the sodium salt of the sulphonic acid. The conditions under which the reactions are carried out are substantially similar to those described in connection with the sodium sulphite and it is only necessary to substitute sodium bisulphite for the sodium sulphite in the process described. The reaction which occurs when sodium bisulphite is employed may be represented by the following reaction:

4-pyridyl pyridinium dichloride (1 mol) +sodium bisulphite (2 mols) =4-pyridine sulphonic acid (2 mols) +sodium chloride (2 mols).

The invention is further illustrated by the following specific examples showing preferred methods for carrying out the present invention which is not limited to the details set forth.

Example 1

20 parts by weight of 4-pyridyl pyridinium dichloride dissolved in a small amount of water are placed in an ampule or pressure bottle and to this is added a solution of sodium sulphite containing 3 molecular proportions of sodium sulphite. The ampule is sealed and placed in an autoclave where it is heated at 150°–155° C. for about eight hours. After cooling the ampule is opened, the solution treated with decolorizing carbon and filtered. The filtrate is concentrated to a small volume or until the precipitation of solid material causes bumping. The material is then extracted with absolute methyl alcohol, filtered, and reconcentrated to a small volume. This is then taken up in hot ethyl alcohol and the 4-pyridine sulphonic acid crystallized from this solution.

Example 2

20 parts by weight of 4-pyridyl pyridinium dichloride dissolved in a small amount of water are placed in an ampule or pressure bottle, and to this is added a solution of sodium bisulphite containing 3 molecular proportions of sodium bisulphite. The ampule is sealed and placed in an autoclave where it is heated at 150°–155° C. for about eight hours. After cooling the ampule is opened, the solution treated with decolorizing carbon and filtered. The filtrate is concentrated to a small volume or until the precipitation of solid material causes bumping. The material is then extracted with absolute methyl alcohol, filtered, and reconcentrated to a small volume. This is then taken up in hot ethyl alcohol and the 4-pyridine sulphonic acid crystallized from this solution.

In the above examples, the sodium sulphite or sodium bisulphite may be replaced either in part or entirely by other suitable sulphites, as for example, potassium sulphite and potassium bisulphite. Likewise, the temperature at which the reaction is carried out and the length of time to which the reactants are subjected to the temperatures may be varied.

What I claim is:

1. The process of preparing 4-pyridine sulphonic acid which comprises reacting an aqueous solution of 4-pyridyl pyridinium dichloride with sodium bisulphite in a closed container at a temperature of from about 140° to 160° C.

2. The process of preparing the sodium salt of 4-pyridine sulphonic acid which comprises heating an aqueous solution of 4-pyridyl pyridinium dichloride with sodium sulphite in a closed container at the reaction temperature.

3. The process of preparing the sodium salt of 4-pyridine sulphonic acid which comprises reacting an aqueous solution of 4-pyridyl pyridinium dichloride with sodium sulphite in a closed container at a temperature of from about 140° to 160° C.

4. The process of preparing 4-pyridine sulphonic acid which comprises heating 4-pyridyl pyridinium dichloride in the presence of water with a substance included in the group consisting of alkali metal bisulphites in a closed container at the reaction temperature.

5. The process of preparing 4-pyridine sulphonic acid which comprises heating an aqueous solution of 4-pyridyl pyridinium dichloride with sodium bisulphite in a closed container at the reaction temperature.

6. The process of preparing 4-pyridine sulphonic acid which comprises hydrolyzing 4-pyridyl pyridinium dichloride by treatment with a substance included in the group consisting of sulphites and bisulphites.

7. The process of preparing 4-pyridine sulphonic acid which comprises hydrolyzing 4-pyridyl pyridinium dichloride by heating at the reaction temperature with a substance of the group consisting of an aqueous solution of a sulphite and an aqueous solution of a bisulphite.

ADOLPH E. TIESLER.